Oct. 9, 1934.  R. S. TROTT  1,975,810
ENGINE MOUNTING
Filed Nov. 30, 1931  2 Sheets-Sheet 1
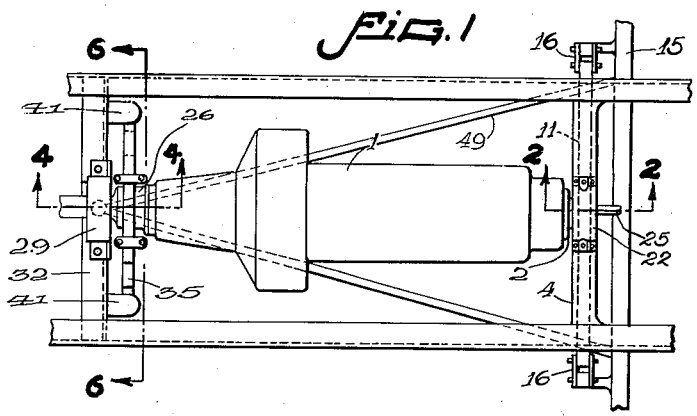
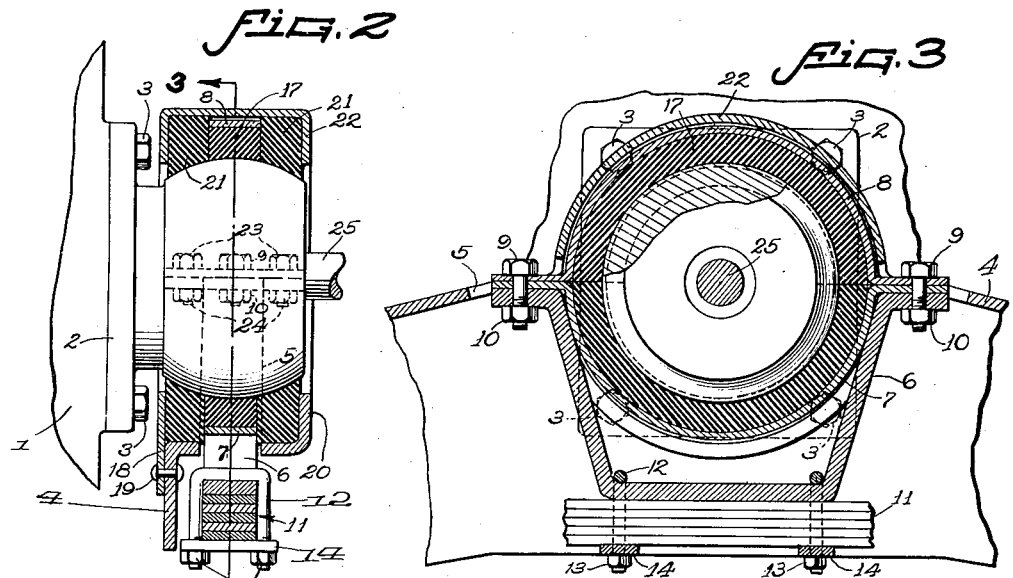
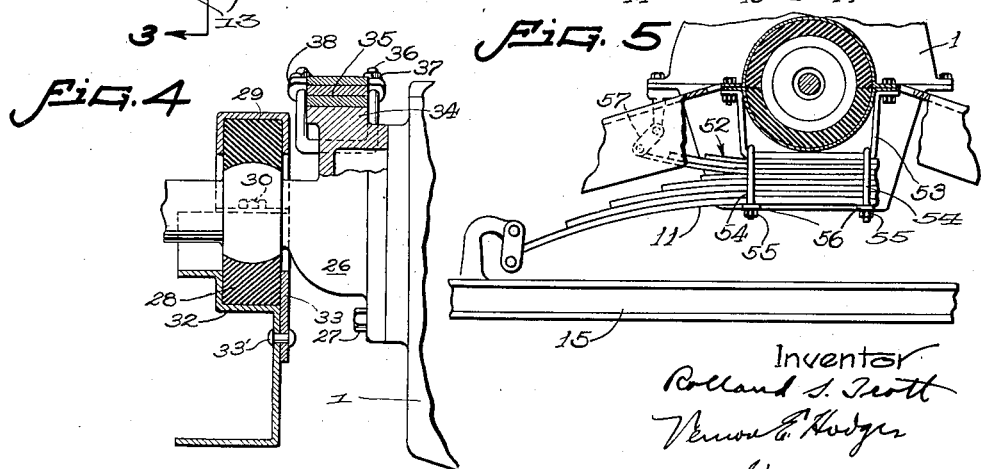
Inventor
Rolland S. Trott
Vernon E. Hodges
his Attorney Oct. 9, 1934.  R. S. TROTT  1,975,810
ENGINE MOUNTING
Filed Nov. 30, 1931  2 Sheets-Sheet 2
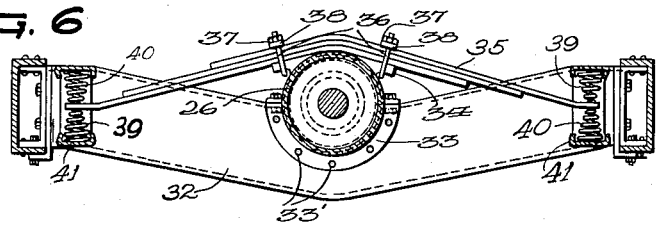
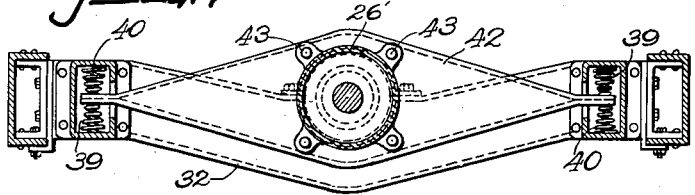
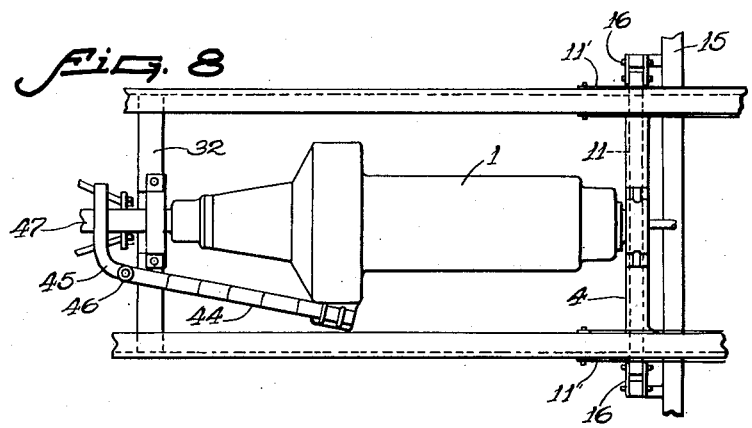
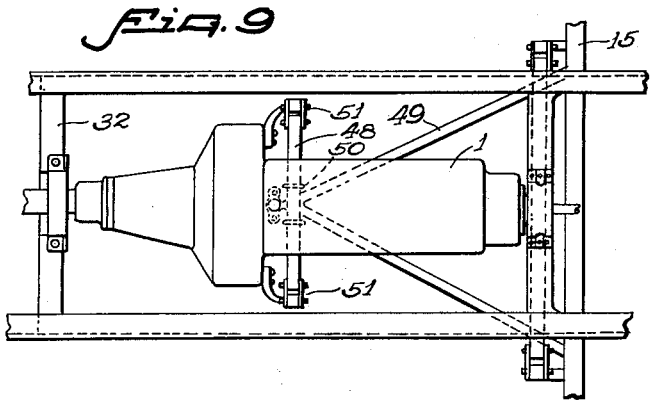
Inventor
Rolland S. Trott
Vernon E. Hodges
his Attorney Patented Oct. 9, 1934

1,975,810

UNITED STATES PATENT OFFICE 1,975,810

ENGINE MOUNTING

Rolland S. Trott, Denver, Colo.

Application November 30, 1931, Serial No. 578,112

12 Claims. (Cl. 180—64)

My invention relates to engine unit or power plant mountings for automotive vehicles, and is an improvement over my former invention on Engine mountings, application for patent on which was filed on November 24, 1928, Serial No. 321,634, now Patent No. 1,890,871, dated Dec. 13, 1932.

In my former invention, the rear of the power plant was mounted pivotally upon the frame, and the front of the power plant was mounted upon a cross spring carried directly by the front axle, this front spring being so designed and constructed as to cause the movements of the power plant upon its front spring to harmonize as closely as possible with the movements of the vehicle frame upon the springs carried by the front axle.

Where the weight of the power plant is large in proportion to its torque, the engine supporting spring must be strong enough to support the weight and perhaps will not be weak enough to properly cushion the torque. Where the torque of the power plant is high in proportion to its weight, the strength of the front engine spring to properly carry the engine torque, may be greater than is required to carry its weight, making proper harmony of action between the front of the engine and the front of the frame difficult to obtain.

The object of this invention is to provide an engine mounting in which the front mounting of the engine unit is combined with the mounting of the frame to make a simplified pivotal mounting for both.

I accomplish this object by providing a rear mounting of the engine unit upon a frame cross member which will permit any engine movement provided by the front mounting, while acting to longitudinally position the engine unit; by providing a torque construction between the engine unit and some part of the vehicle; and by providing a pivotal mounting for the front of the engine unit upon a spring mounted upon the front axle of the vehicle and by providing a pivotal cushioned mounting of the front of the vehicle frame upon said front spring.

All of this is described below, and is illustrated in the drawings in which:

Figure 1 is a plan view of a portion of a motor vehicle provided with my engine mounting.

Figure 2 is a section on the line 2—2 of Figure 1.

Figure 3 is a section on the line 3—3 of Figure 2.

Figure 4 is a section on the line 4—4 of Figure 1.

Figure 5 is a detail showing a torque spring between the engine unit and the front axle spring.

Figure 6 is a section on the line 6—6 of Figure 1.

Figure 7 is a modified form of the construction shown in Figure 6.

Figure 8 is a plan view showing a torque construction between the engine unit and the rear reach.

Figure 9 is a plan view showing a torque construction between the engine unit and the front reach.

In Figures 1, 2, and 3, the engine unit 1 is at the front provided with an engine bracket 2, attached to the engine unit 1 by the bolts 3, or in any other proper manner, and it may even be made integral with the engine unit 1 so long as it acts to securely mount the front of the engine unit.

The outer surface of the bracket 2 is spherical in shape. The frame front cross member 4 is provided with a slot 5 through which fits the spring bracket 6 which carries the two mounting caps 7 and 8, the caps being secured to the bracket 6 by the bolts 9 and nuts 10.

The bracket 6 is secured to the spring 11 by the clips 12 and the nuts 13 and bars 14, or in any other proper manner. The spring 11 is mounted upon the axle 15 by the shackles 16. The non-metallic member 17 is split in halves and fits the spherical outer contour of the engine bracket 2 and is held between the caps 7 and 8.

The frame cross member 4 is provided with the plate 18 secured thereto by the rivets 19 or in any other proper manner, which plate 18, with the flange 20 of the cross member 4, acts to longitudinally position the non-metallic members 21 which are carried by the cross member 4 and which bear against the outer spherical face of the engine bracket 2, and are on the opposite sides of the member 17 and the caps 7 and 8. The cap 22 is secured to the cross member 4 by the bolts 23 and nuts 24 and is slotted for the reception of and working clearance with, the caps 7 and 8 and the non-metallic member 17. Any material either metallic or non-metallic, may be used for either the non-metallic member 17 or the non-metallic members 21, depending upon the requirements and conditions of any special case.

It will be seen that by this construction, both the frame and the engine unit are pivotally mounted in a reliable manner upon the spring 11. Though, the construction is cheap, compact, and reliable, any other proper construction which will pivotally connect the frame, the engine and the spring, may be employed and though, as shown, this pivotal mounting is concentric with the crankshaft 25 of the engine unit, it may be displaced laterally as required for proper balance or as desired, if an unbalanced mounting is required, and it may be displaced vertically either above or below the crankshaft 25 depending upon the result required and various factors that have to be considered in each different installation. In any case, the engine unit, will be substantially incapable of transmitting torque reaction to the frame through the front mounting and the orbital movement permitted by both frame and spring connections with the engine unit will tend to eliminate engine vibration from the frame.

In Figures 1, 4, and 6, the rear mounting of the engine unit 1 is illustrated. The engine bracket 26 is attached to the engine unit 1 by the bolts 27 or in any other proper manner, or may even be made integral with the engine unit so long as the construction is satisfactory.

The engine unit bracket 26 is provided with a spherical outer surface which is mounted in the split non-metallic member 28. The cap 29 is held by the bolts 30 and the nuts 31 to the cross member 32 of the frame, the plate 33 being secured to the member 32 by the rivets 33' or in any other proper manner, assisting in the location of the non-metallic member 28.

The engine unit bracket 26 is provided with the spring seat 34 to which is secured the torque spring 35 by the clips 36, nuts 37 and bars 38, or by any other proper construction. The ends of the spring 35 are positioned between the coil springs 39 and 40 which are carried by the housings 41. The housings 41 are riveted, welded, or in any other proper manner attached to the cross member 32. Since the ends of the spring 35 are diametrically opposite, the spring 35 will resiliently resist the torque reaction of the engine unit without placing a resultant pressure upon the non-metallic member 28 of the rear mounting, and hence will place no resultant force upon the mounting on the cross member 32.

In Figure 7, the torque spring 35 is replaced by the torque member 42 which is secured to the engine bracket 26' by the rivets 43 or in any other proper manner. In this construction, the springs 39 and 40 alone are relied upon to resiliently transmit the torque reaction of the engine unit to the frame member 32.

In Figure 8, the torque spring 44 is attached to the reach bracket 45 as at the point 46, whereby the torque reaction of the engine unit is transmitted to the rear reach 47. In this case, the springs 11' are employed to align the axle 15 and to carry part of the weight of the frame.

In Figure 9, the torque spring 48 is attached to the reach 49 by the nutted clips 50 and is properly connected to the engine unit 1 by means of the shackles 51. By this construction, the torque reaction of the engine unit is resiliently transmitted to the front axle 15.

In Figure 5, it will be seen that the torque spring 52 is clamped between the spring bracket 53 and the spring 11 by the clips 54, nuts 55, and bars 56, and the torque spring 52 is properly attached to the engine unit 1 by the shackles 57. By this construction, the torque reaction of the engine unit 1 is resiliently transmitted from the engine unit to the front axle 15 through the springs 52 and 11.

It will now be seen that as shown in Figure 1, the rear of the engine unit is carried by a construction composed of the cross frame member 32, the springs 35, 39 and 40, the engine bracket 26, and the non-metallic member 28, but the latter may carry all of the weight, if desired; and the front of the engine unit and of the frame are both pivotally carried in whole or in part by the spring 11.

It will be seen, however, that if desired, the front of the frame and of the engine unit may be pivotally mounted upon the spring 11 and the rear of the engine unit may be pivotally carried by the rear mounting upon the cross member 32, while the torque reaction of the power plant may be carried either to the front or rear reach or to the front axle as desired, and depending upon the conditions and requirements in each case; that is, the engine unit may be pivoted at the rear upon the frame, and the front of the engine unit and the front of the frame may be pivotally mounted upon the front axle spring, and the torque stabilizer connection may be provided between the engine unit and some part of the vehicle.

Having now described my invention, what I claim as new and desire to protect by Letters Patent is as follows:

1. In a motor vehicle having a frame and at least a front axle, the combination of an engine unit, means movably mounting the engine unit at its rear upon the frame of the vehicle, resilient means carried by the front axle of the vehicle, means pivotally mounting the front of the frame and the front of the engine unit upon said resilient means, and stabilizer means between the engine unit and some part of the vehicle.

2. In a motor vehicle having a frame and at least a front axle, the combination of an engine unit, an engine unit mounting comprising resilient means carried by the front axle of the vehicle, means pivotally mounting the front of the frame and the front of the engine unit of the vehicle upon said resilient means, and a rear mounting comprising a cross member of the vehicle frame, mounting means movably mounting the rear of the engine unit upon said cross member and provided with transversely extending torque transmitting means and means resiliently connecting the torque transmitting means to said cross member at diametrically opposite points.

3. In a motor vehicle having a frame and axle means, the combination with an engine unit, of resilient means carried by the axle means, a mounting structure carried by the resilient means and having pivotal supporting connection with end portions of the engine unit and frame, and means for supporting the opposite end portion of the engine unit.

4. In a motor vehicle having a frame and axle means, the combination with an engine unit, of resilient means carried by the axle means, a mounting structure carried by the resilient means and having pivotal connection with end portions of the engine unit and frame, and supporting said end portions, and means for supporting the opposite end portion of the engine unit on the vehicle.

5. A motor mounting comprising a spring support, a bracket carried thereby and having upstanding arms, opposed mounting caps of approximately cylindrical shape carried by said upstanding arms, and bearing means housed within said caps.

6. A motor mounting comprising a spring support, a bracket carried thereby and having upstanding arms, opposed mounting caps of approximately cylindrical shape carried by said upstanding arms, and a non-metallic bearing member housed within said caps.

7. A motor mounting comprising a spring support, a bracket carried thereby and having upstanding arms, opposed mounting caps of approximately cylindrical shape carried by said upstanding arms, a non-metallic bearing member housed within said caps, and non-metallic bearing members housed within the caps on opposite sides of the first-mentioned bearing member, said bearing members having the inner surfaces thereof shaped to fit a spherical projection on the motor.

8. In a motor vehicle having a frame, wheel and axle means, and an engine unit, the combination of resilient means carried by the wheel and axle means, means pivotally mounting the front end portions of the frame and engine unit on said resilient means, and means mounting another longitudinally spaced portion of the engine unit on the frame.

9. In a motor vehicle having a frame, wheel and axle means, and an engine unit, the combination of resilient means carried by the wheel and axle means, means pivotally mounting the front end portions of the frame and engine unit on said resilient means, and means mounting another longitudinally spaced portion of the engine unit on the frame permitting oscillation of the engine unit relative to the frame about a longitudinally extending axis, at least one of said mounting means being so constructed and arranged as to resiliently stabilize the engine unit relative to the frame.

10. In a motor vehicle having a frame, wheel and axle means, and an engine unit having a front projection, the combination of resilient means carried by the wheel and axle means, means pivotally connected with said engine front projection and mounting the front of the engine unit on said resilient means, means pivotally connected with and supported by said engine front projection and mounting the front portion of the frame thereon, and means mounting the rear end portion of the engine unit on the frame.

11. In a motor vehicle having a frame, wheel and axle means, and an engine unit, the combination with said engine unit, of means mounting the engine unit in the vehicle comprising resilient means carried by the wheel and axle means, and a mounting structure carried by the resilient means and having pivotal supporting connection with adjacent end portions of the engine unit and frame, said mounting structure being so constructed and arranged as to permit pivotal movement of said engine unit and frame relative to each other and relative to the wheel and axle means.

12. In a motor vehicle having a frame, wheel and axle means, and an engine unit, the combination with said engine unit, of means mounting the engine unit in the vehicle comprising a leaf-spring extending transversely of the vehicle and having opposite ends thereof loosely mounted on the wheel and axle means, and a mounting structure carried by the leaf-spring and having pivotal supporting connections with end portions of the engine unit and frame.

ROLLAND S. TROTT.